United States Patent [19]

Okita et al.

[11] Patent Number: 4,664,964

[45] Date of Patent: May 12, 1987

[54] MAGNETIC RECORDING MEDIUM

[75] Inventors: Tsutomu Okita; Hiroshi Hashimoto, both of Kanagawa, Japan

[73] Assignee: Fuji Photo Film Co., Ltd., Kanagawa, Japan

[21] Appl. No.: 726,266

[22] Filed: Apr. 23, 1985

[30] Foreign Application Priority Data

Apr. 23, 1984 [JP] Japan .................................. 59-80287
Apr. 23, 1984 [JP] Japan .................................. 59-80288

[51] Int. Cl.$^4$ ............................................. G11B 5/702
[52] U.S. Cl. ..................................... 428/143; 427/44; 427/128; 427/131; 428/148; 428/216; 428/425.9; 428/522; 428/694; 428/900
[58] Field of Search .................... 427/44, 128, 131; 428/694, 216, 695, 900, 143, 148, 425.9, 522, 336; 252/62.54; 360/134–136

[56] References Cited

U.S. PATENT DOCUMENTS

| 4,428,974 | 1/1984 | Okita | 427/44 |
| 4,468,436 | 8/1984 | Okita | 428/900 |
| 4,496,626 | 1/1985 | Kasuga | 428/900 |
| 4,511,629 | 4/1985 | Konno | 428/900 |
| 4,619,586 | 10/1986 | Kamada | 428/900 |

*Primary Examiner*—Ellis P. Robinson
*Attorney, Agent, or Firm*—Sughrue, Mion, Zinn, Macpeak, and Seas

[57] ABSTRACT

A magnetic recording medium is described, comprising a non-magnetic support having coated thereon an intermediate layer and a magnetic layer having ferromagnetic particles dispersed in a binder, wherein the surface roughness of the coated surface of the support is 0.01 μm or more, the intermediate layer is formed by using a compound that is polymerizable by radiation exposure being exposed to radiation, and the magnetic layer is formed by using a compound as a binder that is polymerizable by electron beam exposure being exposed to an electron beam.

16 Claims, No Drawings

MAGNETIC RECORDING MEDIUM

FIELD OF THE INVENTION

The present invention relates to a magnetic recording medium, and more particularly to a magnetic recording medium useful for high density recording.

BACKGROUND OF THE INVENTION

Magnetic recording media for high density recording have been developed, and thus better surface smoothness of the magnetic layer of the magnetic recording medium is required to reduce space loss between a magnetic head and a magnetic recording tape. For this purpose, it is necessary to improve the surface smoothness of a magnetic layer. The surface smoothness of a magnetic layer can be improved by improving methods for producing magnetic recording media, for example, with respect to methods for dispersing the magnetic particles, coating methods, surface molding methods, and by improving surface smoothness of a support thereunder. Also, attempts have been made to make magnetic recording layers thinner in order to reduce loss which is caused due to the thickness of the layer, because the recording wavelength becomes shorter with increases in the recording density. Accordingly, higher surface smoothness of the support is required as the magnetic layer provided thereon is made thinner.

However, increasing the surface smoothness of a support which is used for a magnetic recording medium is limited for several reasons. Particularly, if the surface smoothness of the support is very high, it does not move smoothly in the step of winding it which is conducted after a film-coating step (e.g., calendering), and wrinkles tend to be generated on the film, because the frictional resistance of the film to rollers used for transporting the film is increased. Also, the shape of the wound film is not uniform, because frictional resistance between opposite surfaces of the rolled film is increased.

Various methods have been proposed to overcome the foregoing problems. For example it is disclosed in Japanese Patent Application (OPI) No. 109,605/83 (the term "OPI" as used herein means a "published unexamined Japanese Patent Application) that fine particles of thermoplastic resins which are present on a support can be removed by dissolving them with a solvent, after the support is wound up, and then a magnetic layer is coated on the support. However, even this method has not been able to provide fully satisfactory characteristics for a magnetic recording medium to be used for high density recording.

To solve the above problems, it has been proposed by the inventors of the present invention, as disclosed in Japanese Patent Application No. 187519/83 (corresponding to U.S. patent application Ser. No. 657,991 filed on Oct. 5, 1983) that an intermediate layer containing a compound which is polymerizable by radiation exposure be provided on a support having a surface roughness of 0.01 $\mu$m or more, and be exposed to radiation for polymerization, followed by providing a magnetic layer thereon. Accordingly, even though a support having a high surface roughness is used, by providing a intermediate layer having a good surface smoothness, a magnetic layer having a good surface smoothness can be provided. However, when a magnetic layer is subjected to heat treatment for hardening, the surface of the magnetic layer is generally deteriorated. The inventors have made extensive studies on this problem and have found that the deterioration of the surface of the magnetic layer is due to the back surface of the support when the magnetic layer is subjected to heat treatment for hardening. That is, heat curing treatment is generally conducted, for example, at 60° C. to 80° C. for several days. The support thus provided with the foregoing intermediate layer and the magnetic layer thereon is wound up in a rolled state after the magnetic layer is dried, and is subjected to heat treatment in a rolled state for a long period of time. Therefore, the surface roughness on the back surface of the support transfers to the surface of the magnetic layer in contact therewith, and the surface smoothness of the magnetic layer is deteriorated.

SUMMARY OF THE INVENTION

A first object of the present invention is to provide a magnetic recording medium which has none of the defects of conventional magnetic recording media as described above and is suitable for high density recording.

A second object of the present invention is to provide a magnetic recording medium having excellent electromagnetic properties such as video sensitivity and C/N (carrier/noise ratio).

A third object of the present invention is to provide a magnetic recording medium having good adhesion of a magnetic layer and having good durability.

A fourth object of the present invention is to provide a magnetic recording medium which does not require a step of heating a magnetic layer.

As a result of extensive study, particularly in view of the problem that when the support having a magnetic layer which is not hardened is wound in a rolled state, the surface roughness of the support does not transfer to the magnetic layer and thus the surface thereof is not deteriorated, it has now been found by the inventors that a magnetic recording medium having a good surface smoothness which is suitable for high density recording can be obtained by providing a radiation polymerizable intermediate layer on a support, radiation-exposing it, then providing a magnetic layer thereon and electron-irradiating the magnetic layer to harden it.

Accordingly, the present invention is directed to a magnetic recording medium comprising a non-magnetic support having coated thereon an intermediate layer and a magnetic layer having ferromagnetic particles dispersed in a binder, wherein the surface roughness of the coated surface of the support is 0.01 $\mu$m or more, the intermediate layer is formed by using a compound that is polymerizable by radiation exposure being exposed to radiation, and the magnetic layer (provided on the intermediate layer after radiation-exposing the intermediate layer) is formed by using a compound as a binder that is polymerizable by electron beam exposure being exposed to an electron beam.

DETAILED DESCRIPTION OF THE INVENTION

The surface roughness of the non-magnetic support may be the same or different between the coated surface on which the intermediate layer is formed and the back surface.

When a magnetic layer is hardened by heating as conventionally conducted, the magnetic layer is heated while in a rolled state for a long period of time. Therefore, the surface roughness of the back surface of the support transfers to the magnetic layer and the smoothness of the surface of the magnetic layer is deteriorated. In this connection, improvement of the surface smoothness of the back surface of the support has been proposed, but this requires extremely high technical skills and causes the problem of non-uniform winding during film-coating. Furthermore, it has been proposed to provide a backing layer such as the above-described intermediate layer on the back surface of the support, but this extra step in preparing a magnetic recording medium causes manufacturing costs to increase.

On the contrary, in the present invention, as heat treatment is not conducted, the surface roughness of the back surface of the support can be neglected. In light of the film-coating step, a support having the same surface roughness on the front and back surfaces can be prepared, which is advantageous.

Supports that can be used in the present invention include polyesters such as polyethylene terephthalate, or polyethylene-2,6-naphthalate; polyolefines such as polyethylene or polypropylene; cellulose derivatives such as cellulose triacetate, cellulose diacetate, cellulose acetate butyrate or cellulose acetate propionate; vinyl type resins such as polyvinyl chloride or polyvinylidene chloride; other plastics such as polycarbonate, polyimide or polyamide imide; non-magnetic metals such as aluminum, copper, tin, zinc or a non-magnetic alloy including the above metals or stainless copper; and a paper coated or laminated with α-polyolefins having from 2 to 10 carbon atoms such as polyethylene, polypropylene or an ethylenebutene copolymer.

The thickness of the support is generally from 5 to 80 μm, and preferably from 6 to 20 μm.

The "surface roughness" as referred to in the case of the present invention is a center line average roughness which is defined in JIS-B 0601, Vol. 5. The cut off value is 0.25 mm.

The surface roughness of the support that is coated in the present invention is 0.01 μm or more, and preferably from 0.015 μm to 0.5 μm.

A backing layer can be provided on the back surface of the support for the purpose of improving running properties, as described in U.S. Pat. Nos. 3,761,311 and 3,166,688.

Compounds which are polymerized by radiation exposure in the intermediate layer of the present invention include compounds having at least one carbon-carbon unsaturated bond per monomer molecule. Typical examples of the compounds include acrylates, acrylamides, methacrylates, methacrylamides, allyl compounds, vinyl ethers, vinyl esters, heterocyclic vinyl compounds, N-vinyl compounds, styrenes, crotonic acids, itaconic acids and olefins. Preferred compounds include compounds containing at least two acryloyl groups or methacryloyl groups, such as acrylates (e.g., diethylene glycol diacrylate, triethylene glycol diacrylate, tetraethylene glycol diacrylate, trimethylol propane triacrylate, and pentaerythritol tetraacrylate), methacrylates (e.g., diethylene glycol dimethacrylate, triethylene glycol trimethacrylate, tetraethylene glycol dimethacrylate, trimethylol propane trimethacrylate, and pentaerythritol tetramethacrylate) or esters of polyols having two or more functional groups and acrylic or methacrylic acid.

These compounds can be polymeric compounds. Preferred compounds have acrylate or methacrylate bond at the terminal of the main chain or side chains of the polymer structure, and are disclosed, e.g., in *Fatipec Congress*, A. Vranckem, Vol. 11, p. 19 (1972).

An example is shown below.

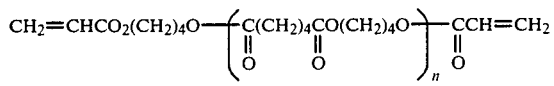

The polyester skeleton (central portion) of the above described compound can be a polyurethane skeleton, an epoxy resin skeleton, a polyether skeleton, a polycarbonate skeleton or a mixture thereof, with a polyester skeleton and a polyether skeleton being preferred. The molecular weight of the compound is generally from 200 to 20,000, preferably from 500 to 10,000, and more preferably from 1,000 to 5,000, but is not particularly limited. Of these, polyesterpolyacrylate oligomers and polyetherpolyacrylate oligomers are particularly preferred.

The above-described compounds which can be polymerized by radiation exposure can be used alone or in combinations having an optional mixing ratio thereof.

Additionally, thermoplastic resins such as vinyl chloride-vinylidene chloride type resin, urethane resin, acrylonitrile butadiene resin, vinyl chloride-vinyl acetate type copolymers, cellulose type resin or acetal type resin can be used in combination with the compounds which can be polymerized by radiation exposure, if desired.

The radiation for the intermediate layer used in the present invention is electron beams or ultraviolet radiation. When an ultraviolet ray is used, a photopolymerization initiator can be added to the above described compounds. The photopolymerization initiator is not limited, but those which have a relatively larger absorption coefficient at the wavelengths of 254, 313 and 365 nm (i.e., the line spectrum of a mercury lamp generally used as an ultraviolet irradiation light source) are preferred. Typical examples include various aromatic ketones such as acetophenone, benzophenone, benzoin ethyl ether, benzyl methyl ketal, benzyl ethyl ketal, benzoin isobutyl ketone, hydroxy dimethyl phenyl ketone, 1-hydroxycyclohexyl phenyl ketone, 2,2-diethoxy acetophenone or Michler's ketone. The photopolymerization initiators are generally used in a mixing ratio of from 0.5 to 20 parts by weight, preferably from 2 to 15 parts by weight, and more preferably from 3 to 10 parts by weight, per 100 parts by weight of the polymerizable compounds.

When the intermediate layer is coated on a support, various organic solvents can be used, if desired. When the polymerizable compound is a liquid, a solvent is not necessary. Organic solvents that can be used according to the present invention include ketones such as acetone, methyl ethyl ketone, methyl isobutyl ketone or cyclohexanone; alcohols such as methanol, ethanol, propanol or butanol; esters such as methyl acetate, ethyl acetate, butyl acetate, ethyl lactate or Cellosolve acetate; glycol ethers such as ether, glycol dimethyl ether, glycol monoethyl ether or dioxane; tars (aromatic hydrocarbons) such as benzene, toluene or xylene; and methylene chloride, ethylene chloride, carbon tetrachloride, chloroform, ethylene chlorohydrin tetrahydrofuran or dichlorobenzene.

The intermediate layer generally has a thickness of from 0.1 to 2 μm, preferably from 0.3 to 1.5 μm, and more preferably from 0.5 to 1.2 μm after it is hardened by polymerization with radiation exposure. It preferably has a surface roughness of 0.01 μm or less. The surface roughness can be effectively adjusted to the above range utilizing a leveling effect. That is, a compound having a comparatively low viscosity is desirably employed or an organic solvent is used to adjust the coating composition to have a low viscosity so that the coated composition is self leveling.

A scanning method, a double scanning method or a curtain beam method can be used for accelerating electron beams in hardening the intermediate. A curtain beam method is preferred because its cost is comparatively low and its large output is given. The electron beam irradiation can be carried out using an accelerating voltage of from 10 to 1,000 kV, preferably from 50 to 300 kV, and an absorption dose of 0.5 to 20 megarads, preferably 1 to 10 megarads. When the accelerating voltage is less than 10 kV, the amount of energy transmitted is insufficient and when the accelerating voltage exceeds 1,000 kV, the energy efficiency of the polymerization decreases and becomes uneconomical.

When the absorption dose is less than 0.5 megarad, the hardening reaction is insufficient. When the absorption dose is more than 20 megarads, the energy efficiency used for hardening reaction is lowered or the irradiated object generates heat, whereby a plastic support tends to deform.

According to the present invention, a magnetic coating composition containing a compound that is polymerizable by electron beams exposure is coated on the thus prepared intermediate layer and the resulting magnetic layer is exposed to an electron beam to polymerize and harden it.

That is, a coating composition containing ferromagnetic particles and a compound that is polymerizable by electron beam exposure such as urethane acrylate oligomer and/or acrylate monomer is coated to prepare a magnetic layer, and the magnetic layer is dried, subjected to a smoothing treatment, and is then exposed to electron beams.

The magnetic layer can be hardened in an extremely short period of time by employing electron beams exposure. After a magnetic layer is coated, dried, and subjected to smoothing treatment by calendering, the support is wound up into a rolled state, and is then exposed to electron beams. In this case, since heat treatment is not conducted in the present invention, surface roughness on the back surface of the support does not transfer to the surface of a magnetic layer, and accordingly it does not deteriorate the surface smoothness of the magnetic layer. As hardening by electron beams exposure can be completed in a short period of time, steps for preparing an intermediate layer, coating, drying, smoothing and hardening of the magnetic layer can proceed continuously, manufacturing efficiency increases and the transfer of surface roughness of the back surface to the surface of the magnetic layer does not occur.

A magnetic layer of the present invention can be prepared by coating a magnetic coating composition containing a compound that is polymerizable by electron beam exposure, drying the thus-prepared magnetic layer, which is then exposed to electron beams. The magnetic coating composition contains a compound that is polymerizable by electron beam exposure such as urethane acrylate oligomer and/or acrylate monomer as a binder.

By the use of the above compound as a binder, durability under high temperature conditions can be markedly improved even after the repeated use, and wear resistance of a magnetic layer under a normal use can be markedly improved.

The urethane acrylate oligomer can be a compound having at least two acryloyl groups at the terminal of or at the side of the chain per monomer molecule, having a polyester urethane skelton or a polyether urethane skeleton, and having a molecular weight of 1000 or more, and preferably up to 100,000, more preferably from 3,000 to 50,000, and most preferably from 5,000 to 30,000. When the molecular weight is 1000 or less, the magnetic layer tends to be brittle.

The acrylate monomer can be a compound having at least two acryloyl groups or methacryloyl groups per monomer molecule and a molecular weight of 600 or less. Preferred examples include ethylene glycol di(metha)acrylate, diethylene glycol di(metha)acrylate, triethylene glycol di(metha)acrylate, triethylene glycol tri(metha)acrylate, tetraethylene glycol di(metha)acrylate, hexaethylene glycol di(metha)acrylate, propadiol di(metha)acrylate, butanediol di(metha)acrylate, pentanediol di(metha)acrylate, neopentyl glycol di(metha)acrylate, hexanediol di(metha)acrylate, cyclohexane diol di(metha)acrylate, trimethylol propane tri(metha)acrylate, pentaerythritol tri(metha)acrylate, pentaerythritol tetra(metha)acrylate and poly(metha)acrylate of other polyol having two or more functional groups.

It is particularly preferred that the urethane acrylate oligomer and the acrylate monomer having at least two acryloyl groups or methacryloyl groups per monomer molecule are used in combination. The weight ratio of urethane acrylate oligomer to acrylate monomer is preferably from 60/40 to 90/10, most preferably from 70/30 to 85/15 in view of polymerization efficiency.

Further, in the present invention, cellulose type resins, vinyl chloride vinyl acetate type resins, uethane resins, an other monomers can be used in combination with the urethane acrylate oligomer and/or the acrylate monomer. As an embodiment of the present invention, a binder composition of the magnetic layer comprises (1) cellulose type resins or vinyl chloride-vinyl acetate type resins, (2) urethane resins or urethane acrylate oligomers and (3) monomers.

The cellulose type resins (1) include nitrocellulose, cellulose acetate butyrate and cellulose acetate propionate, with nitrocellulose being preferably used.

The vinyl chloride-vinyl acetate type resins (1) in the present invention include vinyl chloride-vinyl acetate copolymer, vinyl chloride-vinyl propionate copolymer, vinyl chloride-vinyl acetate-vinyl alcohol copolymer, vinyl chloride-vinyl acetate-maleic acid copolymer and vinyl chloride-vinyl propionate-vinyl alcohol copolymer.

The monomer (3) include the acrylate monomer as described above and a monomer which can be polymerizable by electron beam exposure and has at least one carbon-carbon unsaturated bond per monomer molecule, such as acrylic acid esters, acrylamides, methacrylic acid esters, methacrylamides, allyl compounds, vinyl ethers, vinyl esters, heterocyclic vinyl compounds, N-vinyl compounds, styrenes, acrylic acid, methacrylic acid, crotonic acids, itaconic acids, olefins and the like.

The amount of components of (1) cellulose type resins or vinyl chloride vinyl acetate type resins, (2) urethane resins or urethane acrylate oligomer, and (3) monomer which are used in the magnetic layer of the present invention is preferably from 25 to 70 parts by weight, from 10 to 40 parts by weight, and from 10 to 60 parts by weight, respectively.

The ferromagnetic particles used in the present invention include ferromagnetic iron oxide fine particles, Co-doped ferromagnetic iron oxide fine particles, ferromagnetic chromium dioxide fine particles, ferromagnetic alloy particles and barium ferrite. The acicular ratio of ferromagnetic iron oxide and chromium dioxide particles is generally from 2/1 to 20/1, preferably 5/1 or more, and the average length is from about 0.2 to 2.0 $\mu$m. Ferromagnetic alloy particles have metal content of 75 wt% or more, and 80 wt% or more of the metal content is ferromagnetic metal (i.e., Fe, Co, Ni, Fe-Co, Fe-Ni, Co-Ni, Fe-Co-Ni) and have a diameter of about 1.0 $\mu$m or less.

Organic solvents that can be used according to the present invention include ketones such as acetone, methyl ethyl ketone, methyl isobutyl ketone, and cyclohexanone; esters such as methyl acetate, ethyl acetate, butyl acetate, ethyl lactate, and Cellosolve acetate; glycol ethers such as ether, glycol dimethyl ether, glycol mono ethyl ether, and dioxane; aromatic hydrocarbons such as benzene, toluene, and xylene; and chlorinated hydrocarbons such as methylene chloride, ethylene chloride, carbon tetrachloride, chloroform, ethylene chlorohydrin, and dichlorobenzene, tetrahydrofuran.

A lubricating agent, an abrasive agent, a dispersing agent, an anti-corrosion agent and an antistatic agent can be added into the magnetic coating composition of the present invention. The lubricating agent used in the present invention includes saturated and unsaturated higher fatty acids, fatty acid esters, higher fatty acid amide, higher alcohols, silicon oil, mineral oil, edible oils, and fluorine compounds. They can be added on preparing the magnetic coating composition or can be directly coated or sprayed on the surface of a magnetic layer with or without dissolving in an organic solvent after drying, smoothing treatment or electron beam exposure.

A scanning method, a double scanning method, a curtain beam method or a broad beam curtain method can be used for accelerating electron beams in hardening the magnetic layer.

The electron beam exposure can be carried out using an accelerating voltage of from 100 to 1,000 kV, preferably from 150 to 300 kV, generally providing an absorption dose of from 0.5 to 20 megarads, and preferably from 3 to 15 megarads. When the accelerating voltage is less than 100 kV, the transmitted amount of energy is insufficient, and when the accelerating voltage exceeds 1,000 kV, the energy efficiency of the polymerization decreases and is uneconomical. When the absorption dose is less than 0.5 megarad, the hardening reaction is insufficient to obtain the desired mechanical strength in the magnetic layer. When the absorption dose is more than 20 megarads, the energy efficiency of the hardening reaction is lowered or the irradiated object generates heat whereby a plastic support tends to deform.

Ferromagnetic particles, various additives, organic solvents and dispersing and coating methods used in the present invention are disclosed in Japanese Patent Application (OPI) No. 46,011/79, and U.S. Pat. Nos. 4,135,016 and 4,205,353.

The thickness of the magnetic layer is not particularly limited, but generally it is from 1.5 to 10 $\mu$m, and preferably from 2 to 5 $\mu$m.

The present invention is further illustrated in more detail by the following Examples and Comparative Examples. In the Examples and Comparative Examples, all parts are by weight.

EXAMPLE 1

A coating composition comprising 40 parts of an acrylate compound having a molecular weight of 1000 which was obtained by acrylate-modifying the terminals of a polyester polyol consisting of butanediol and adipic acid and 60 parts of diethylene glycol diacrylate (60/40 wt%) was coated on a polyethylene terephthalate support having a surface roughness of 0.015 $\mu$m and having a thickness of 14.5 $\mu$m, which was then irradiated with electron beams under an accelerating voltage of 165 kV and beam current of 5 mA having an absorption dose of 3 megarads to prepare an intermediate layer. The thickness of the intermediate layer was 0.5 $\mu$m after hardening.

| | |
|---|---|
| $\gamma$-Fe$_2$O$_3$ (Coescive force: 650 Oe, Particle size: 0.5 $\mu$m × 0.05 $\mu$m) | 400 parts |
| Urethane acrylate (Urethane acrylate compound was obtained by modifying a polyurethane polyol of a condensation product of adipic acid, butanediol and tolylene isocyanate with tolylene diisocyanate and then acrylate-modified by 2-hydroxy ethyl acrylate, Molecular weight: 30,000) | 75 parts |
| Trimethylol propane triacrylate | 25 parts |
| Lecithin | 4 parts |
| Stearic acid | 4 parts |
| Butyl Stearate | 4 parts |
| Methyl ethyl ketone | 1000 parts |

The above composition was mixed and kneaded by a ball mill for 50 hours to prepare a magnetic coating composition, which was then coated by a doctor blade on the foregoing intermediate layer to have a dry thickness of 5 $\mu$m. Thereafter the coated web was subjected to magnetic orientation by running the web over a cobalt magnet having a coercive force of 2,000 Oe at a distance between the web and the cobalt magnet of 5 mm and then the solvent was evaporated by air-drying (wind velocity: 10 m/sec, temperature: 100° C.) for 1 minute. The thus obtained magnetic web was subjected to a smoothing treatment using five calender rolls consisting of a cotton roll and a mirror roll.

The magnetic layer was exposed to electron beams using a curtain beam electron beam accelerator manufactured by ESI Co., Ltd., using an accelerating voltage of 165 kV to have an absorption dose of 10 Mrad for hardening the magnetic layer and thus Sample No. 1 was obtained.

Comparative Example 1

A coating composition comprising 40 parts of an acrylate compound having a molecular weight of 1000 which was obtained by acrylate-modifying the terminals of polyester polyol consisting of butanediol and adipic acid and 60 parts of diethylene glycol diacrylate (60/40 wt%) was coated on a polyethylene terephthalate support having a surface roughness of 0.015 $\mu$m and having a thickness of 14.5 $\mu$m, which was then irradiated with electron beams under an accelerating voltage of 165 kV and beam current of 5 mA having an absorption dose of 3 megarads to prepare an intermediate layer. The thickness of the intermediate layer was 0.9 μm after hardening the intermediate layer.

| | |
|---|---|
| γ-Fe$_2$O$_3$ (as in Example 1) | 400 parts |
| Copolymer of vinyl chloride, vinyl acetate and vinyl alcohol (Copolymerization ratio: 86/10/4, Molecular weight: 40,000) | 60 parts |
| Polyester polyurethane (Adipic acid, butane diol and tolylene diisocyanate, Molecular weight: 100,000) | 40 parts |
| Lecithin | 4 parts |
| Stearic acid | 4 parts |
| Methyl ethyl ketone | 4 parts |

The above composition was mixed and kneaded by a ball mill for 50 hours to prepare a magnetic coating composition, which was then coated by a doctor blade on the foregoing intermediate layer to have a dry thickness of 5 μm. Thereafter the coated web was subjected to magnetic orientation by running the web over a cobalt magnet having a coercive force of 2000 Oe at a distance between the web and the cobalt magnet of 5 mm, and then the solvent was evaporated by air-drying (wind velocity: 10 m/sec, temperature: 100° C.) for 1 minute. The thus-obtained magnetic layer was subjected to a smoothing treatment using five calender rolls consisting of a cotton roll and a mirror roll, whereby Sample No. 2 was obtained.

EXAMPLE 2

A coating composition containing 95 parts of diacrylate of polyethylene glycol (#600), (trademark "14 EGA", manufactured by Kyoei Co., Ltd.) and 5 parts of benzophenone was coated on a polyethylene terephthalate support having a surface roughness of 0.010 μm, and having a thickness of 14.5 μm, which was irradiated with a mercury lamp having 80 w/cm for 1 second. The thickness of the intermediate layer was 0.7 μm after hardening it.

| | |
|---|---|
| γ-Fe$_2$O$_3$ (as in Example 1) | 400 parts |
| Urethane acrylate (Urethane acrylate compound was obtained by modifying polyurethane polyol of condensation product of sebasic acid, phthalic acid, trimethylene glycol and cyclohexane 1,4-diisocyanate with isophorone diisocyanate and then acrylate-modified by 2-hydroxy ethyl acrylate. Molecular weight: 50,000) | 65 parts |
| Diethylene glycol diacrylate | 35 parts |
| Lecithin | 4 parts |
| Stearic acid | 4 parts |
| Butyl stearate | 4 parts |
| Methyl ethyl ketone | 1000 parts |

The above composition was mixed and kneaded by a ball mill for 50 hours to prepare a magnetic coating composition, which was then coated by a doctor blade on the polyethylene terephthalate support having a thickness of 15 μm to have a dry thickness of 5 μm. Thereafter the coated web was subjected to magnetic orientation by running the web over a cobalt magnet having a coercive force of 2000 Oe at a distance between the web and the cobalt magnet of 5 mm, and then the solvent was evaporated by air-drying (wind velocity: 10 m/sec, temperature: 100° C.) for 1 minute. The thus obtained magnetic layer was subjected to smoothing treatment using five calendering rolls consisting of a cotton roll and a mirror roll.

The magnetic layer was exposed to electron beam using an electron beam accelerator having an accelerating voltage of 165 kV to have an absorption dose of 10 Mrads for hardening the magnetic layer, whereby Sample No. 3 was obtained.

Comparative Example 2

The same procedure as in Example 2 was repeated without providing an intermediate layer to obtain Sample No. 4.

Comparative Example 3

The same procedure as in Example 1 was repeated except using the following binder composition instead of urethane acrylate and trimethylol propane triacrylate used as a binder in a magnetic layer in Example 1.

| | |
|---|---|
| Copolymer of vinyl chloride, vinyl acetate and vinyl alcohol (Copolymerization ratio: 86/10/4, Molecular weight: 40,000) | 40 parts |
| Polyester polyurethane (same compound as that used in Comparative Example 1) | 40 parts |
| TDI-3 adduct product of trimethylol propane | 20 parts |

After the magnetic layer was subjected to calender treatment, it was subjected to heat treatment in a rolled state at 60° C. for 5 days. Thus, Sample No. 5 was obtained. The results obtained are shown in Table 1 below.

Video sensitivities, C/N ratio, adhesion force and still durability with regard to those samples were measured in the following manner.

Video sensitivity: The reproduced output was determined at 4 MHz using VHS system VTR ("MV-8800", trade mark, manufactured by Matsushita Electric Industries Co., Ltd.)

C/N: A carrier wave at 35 MHz was recorded on sample tapes. When the tapes were replayed, the carrier and noise were measured. C/N was the ratio of carrier to noise of each sample (corresponding to a signal to noise ratio).

Adhesion force: Adhesion force was measured by adhering an adhesive polyethylene terephthalate tape to the surface of a magnetic tape having a width of ½ inch, and the force with which the adhesive tape was stripped at 180° was determined by a spring balance.

Still durability: Predetermined video signals were recorded on sample tapes using VHS video tape recorder ("NV-8200", trademark for product manufactured by Matsushita Electric Industries Co., Ltd.), and the time for still images to lose their clear images was measured at 5° C., and 65% RH (relative humidity).

| Sample No. | | Surface roughness of intermediate layer (μm) | Video sensitivity (dB) | C/N (dB) | Adhesion force (g) | Still durability |
|---|---|---|---|---|---|---|
| No. 1 | Example 1 | 0.008 | +4.0 | +2.0 | 150 | >30 min. |
| No. 2 | Comparative Example 1 | 0.008 | +2.0 | +1.5 | 98 | <1 min. |

-continued

| Sample No. | | Surface roughness of intermediate layer (μm) | Video sensitivity (dB) | C/N (dB) | Adhesion force (g) | Still durability |
|---|---|---|---|---|---|---|
| No. 3 | Example 2 | 0.005 | +5.0 | +2.3 | 138 | >30 min. |
| No. 4 | Comparative Example 2 | — | ±0 | ±0 | 15 | >30 min. |
| No. 5 | Comparative Example 3 | 0.008 | +1.8 | +1.3 | 80 | >30 min. |

Values of video sensitivities and C/N are shown a relative values when those of Sample No. 4 are ±0 dB.

EXAMPLE 3

A coating composition containing 50 parts of polymer having a molecular weight of 800 which was obtained by acrylate-modifying the terminals of a polyester polyol consisting of diethylene glycol and adipic acid and 50 parts of diethylene glycol diacrylate was coated on a polyethylene terephthalate support having a surface roughness of 0.015 μm and having a thickness of 14.5 μm, which was then exposed to electron beams under an accelerating voltage of 165 kV and beam current of 5 mA having an absorption dose of 3 Mrad to prepare an intermediate layer. The thickness of the intermediate layer was 1.0 μm.

| | |
|---|---|
| $\gamma$-Fe$_2$O$_3$ (as in Example 1) | 400 parts |
| Nitrocellulose ("RS 1/2H", trademark for product manufactured by Daicell Co., Ltd.) | 60 parts |
| Urethane acrylate oligomer ("Aronics M1100", trademark for product manufactured by Toa Gosei Co., Ltd.) | 33 parts |
| Diethylene glycol diacrylate | 7 parts |
| Lecithin | 4 parts |
| Butyl stearate | 4 parts |
| Stearic acid | 4 parts |
| Methyl ethyl ketone | 1000 parts |

The above composition was mixed and kneaded by a ball mill for 510 hours to prepare a magnetic coating composition, which was then coated by a doctor blade on the foregoing intermediate layer to have a dry thickness 5 μm. Thereafter the coated web was subjected to magnetic orientation by running the web over a cobalt magnet having a coercive force of 2000 Oe at a distance between the web and the cobalt magnet of 5 mm, and then the solvent was evaporated by air-drying (wind velocity: 10 m/sec, temperature: 100° C.) for 1 minute. The thus obtained magnetic layer was subjected to a smoothing treatment using five calender rolls consisting of a cotton roll and a mirror roll.

The magnetic layer was then exposed to electron beams by an electron beam accelerator using an accelerating voltage of 165 kV to have an absorption dose of 10 Mrad, to prepare Sample No. 6.

Comparative Example 4

The same procedure as in Example 3 was repeated without providing an intermediate layer, to obtain Sample No. 7.

EXAMPLE 4

A coating composition containing 95 parts of diacrylate of polyethylene glycol (#400) and 5 parts of benzophenone was coated on a polyethylene terephthalate support having a surface roughness of 0.020 μm and having a thickness of 14.5 μm, which was then irradiated with a mercury lamp having 80 w/cm for 1 second. The thickness of the intermediate layer was 0.8 μm after hardening it.

| | |
|---|---|
| $\gamma$-Fe$_2$O$_3$ (as in Example 1) | 400 parts |
| Copolymer of vinyl chloride, vinyl acetate and maleic acid (Copolymerization ratio: 0.2/4/4, Molecular weight: 50,000) | 40 parts |
| Urethane resin (the resin consisting of adipic acid, butane diol and isophorone diisocyanate, Molecular weight: 40,000) | 30 parts |
| Trimethylol propane triacrylate | 30 parts |
| Lecithin | 4 parts |
| Butyl stearate | 4 parts |
| Stearic acid | 4 parts |
| Methyl ethyl ketone | 1000 parts |

The above composition was mixed and kneaded by a ball mill for 50 hours to prepare a magnetic coating composition, which was then coated on the foregoing intermediate layer by a doctor blade to have a dry thickness of 5 μm. Thereafter the coated web was subjected to magnetic orientation by running the web over a cobalt magnet having a coercive force of 2000 Oe at a distance between the web and the cobalt magnet of 5 mm, and then the solvent was evaporated by air-drying (wind velocity: 10 m/sec, temperature: 100° C.) for 1 minute. The resulting magnetic layer was subjected to smoothing treatment using five calender rolls consisting of a cotton rol and a mirror roll.

The magnetic layer was then exposed to electron beams by an electron beam accelerator using an accelerating voltage of 165 kV to have an absorption dose of 10 Mrads for hardening it, whereby Sample No. 8 was obtained.

EXAMPLE 5

Diacrylate of polyethylene glycol (#400) was coated on a polyethylene terephthalate support having a surface roughness of 0.010 μm and having a thickness of 14.5 μm, which was irradiated using an electron beam accelerator having an accelerating voltage of 165 kV and beam current of 5 mA to have an absorption dose of 3 Mrads. The thickness of the intermediate layer was 0.9 μm after hardening it.

| | |
|---|---|
| $\gamma$-Fe$_2$O$_3$ (as in Example 1) | 400 parts |
| Copolymer of vinyl chloride, vinyl acetate and vinyl alcohol (Copolymerization ratio: 86/10/4, Molecular weight: 40,000) | 30 parts |
| Acrylate-modified compound which was obtained by modifying polyurethane polyol of a condensation product of adipic acid, butanediol, and tolylene diisocyanate with isophorone diisocyanate (Molecular weight: 10,000) | 30 parts |
| Trimethylol propane triacrylate | 30 parts |
| Lecithin | 4 parts |
| Stearic acid | 4 parts |
| Butyl stearate | 4 parts |

-continued

| | |
|---|---|
| Methyl ethyl ketone | 1000 parts |

The above composition was mixed and kneaded by a ball mill for 50 hours to prepare a magnetic coating composition, which was then coated by a doctor blade on the foregoing intermediate layer to have a dry thickness of 5 μm. Thereafter the coated web was subjected to magnetic orientation by running the web over a cobalt magnet having a coercive force of 2000 Oe at a distance between the web and the cobalt magnet of 5 mm, and then the solvent was evaporated by air-drying (wind velocity: 10 m/sec, temperature: 100° C.) for 1 minute. The resulting magnetic layer was subjected to a smoothing treatment using five calender rolls consisting of a cotton roll and a mirror roll.

The magnetic layer was then electron beam irradiated using an electron beam accelerator under an accelerating voltage of 165 kV to have an absorption dose of 10 Mrads to prepare Sample No. 9.

Comparative Example 5

An intermediate layer was provided on a polyethylene terephthalate support having a surface roughness of 0.020 μm and having a thickness of 14.5 μm in the same manner as in Example 3.

Video sensitivities, the C/N ratio, adhesion force, still durability and video head stain with regard to those samples were measured in the following manner. The results obtained are shown in Table 2 below.

Video sensitivity: The reproduced output was determined at 4 MHz using VHS system VTR ("MV-8800", trademark manufactured by Matsushita Electric Industries Co., Ltd.)

C/N: A carrier wave at 35 MHz was recorded on sample tapes. When the tapes were replayed, the carrier and noise were measured. C/N was the ratio of carrier to noise of each sample (in other words, the signal to noise ratio).

Adhesion force: Adhesion force was measured by adhering an adhesive polyethylene terephthalate tape to the surface of a magnetic tape having a width of ½ inch, and the force with which the adhesive tape was stripped at 180° was measured by a spring balance.

Still durability: Predetermined video signals were recorded on sample tapes using VHS video tape recorder ("NV-8200", trademark manufactured by Matsushita Electric Industries Co., Ltd.), and the time for still images to lose their clear images was measured at 5° C. and 65% RH.

Video head stain: After sample tapes made 100 passes using a video tape recorder of "NV-8200", at 23° C., and 70% RH, observation was made for any video head stain.

TABLE 1

| Sample No. | | Surface roughness of intermediate layer (μm) | Video sensitivity (dB) | C/N (dB) | Adhesion force (g) | Still durability | Video head stain |
|---|---|---|---|---|---|---|---|
| No. 6 | Example 3 | 0.007 | +3.5 | +2.2 | 170 | >120 min. | No stain |
| No. 7 | Comparative Example 4 | — | ±0 | ±0 | 8 | >120 min. | Stain was observed |
| No. 8 | Example 4 | 0.008 | +4.2 | +2.1 | 158 | >120 min. | No stain |
| No. 9 | Example 5 | 0.009 | +3.8 | +1.9 | 135 | >120 min. | No stain |
| No. 10 | Comparative Example 5 | 0.007 | +3.0 | +1.5 | 160 | 40 min. | Stain was observed |

Values of video sensitivities and C/N are relative values when those of Sample No. 9 are ±0 dB.

| | |
|---|---|
| γ-Fe$_2$O$_3$ (as in Example 1) | 400 parts |
| Urethane resin (same as that used in Example 4) | 60 parts |
| Tetramethylol methane tetraacrylate | 40 parts |
| Lecithin | 4 parts |
| Stearic acid | 4 parts |
| Butyl stearate | 4 parts |
| Methyl ethyl ketone | 1000 parts |

The above composition was mixed and kneaded by a ball mill for 50 hours to prepare a magnetic coating composition, which was coated by a doctor blade on the forgoing intermediate layer to have a dry thickness of 5 μm. The thus prepared magnetic layer was subjected to magnetic orientation by running the web over a cobalt magnet having a coercive force of 2000 Oe at a distance between the web and the cobalt magnet of 5 mm and the solvent was evaporated by air-drying (wind velocity: 10 m/sec, temperature: 100° C.) for 1 minute, and then it subjected to a smoothing treatment using five calender rolls consisting of a cotton roll and a mirror roll.

The magnetic layer was then exposed to electron beams by an electron beam accelerator using an accelerating voltage of 165 kV to have an absorption dose of 10 Mrads for hardening it. Thus, Sample No. 10 was obtained.

It is clear from the above results that the magnetic recording media of the present invention are superior in video sensitivity, C/N, adhesion force, and still durability to Comparative Examples.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having coated thereon an intermediate layer and a magnetic layer having ferromagnetic particles dispersed in a binder, wherein the surface roughness of the coated surface of the support is 0.01 μm or more, the intermediate layer is formed by using a compound that is polymerizable by radiation exposure being exposed to radiation, and the magnetic layer is formed by using a compound as the binder that is polymerizable by electron beam exposure being exposed to an electron beam, wherein the magnetic layer is provided on the intermediate layer after subjecting the intermediate layer to exposure to radiation and further wherein the intermediate layer has a thickness of 0.5 to 1.2 μm, a surface roughness of 0.01 μm or less and wherein the compound is polymerizable by radiation exposure used to form the intermediate layer has a molecular weight of 500 to 10,000.

2. A magnetic recording medium as in claim 1, wherein the compound used in forming the intermediate layer is a compound having at least one carbon-carbon unsaturated bond per monomer molecule.

3. A magnetic recording medium as in claim 2, wherein the compound used in forming the intermediate layer is an acrylate compound having at least two methacryloyl groups or acryloyl groups per monomer molecule.

4. A magnetic recording medium as in claim 1, wherein the compound used in forming the intermediate layer is a compound selected from the group consisting of polyesterpolyacrylate oligomers and polyetherpolyacrylate oligomers.

5. A magnetic recording medium as in claim 1, wherein the magnetic layer has a thickness of from 1.5 to 10 μm.

6. A magnetic recording medium as in claim 1, wherein the compound used in forming the magnetic layer is at least one compound selected from the group consisting of urethane acrylate oligomers and acrylate monomers.

7. A magnetic recording medium as in claim 6, wherein the urethane acrylate oligomer has a molecule weight of from 3,000 to 50,000.

8. A magnetic recording medium as in claim 6, wherein the acrylate monomer has at least two acryloyl or methacryloyl groups per monomer molecule.

9. A magnetic recording medium as in claim 6, wherein the compounds used in forming the magnetic layer are urethane acrylate oligomers and acrylate monomers.

10. A magnetic recording medium as in claim 1, wherein the binder for the magnetic layer comprises (1) a cellulose type resin or a vinyl chloride-vinyl acetate type resin, (2) a urethane resin or a urethane acrylate oligomer, and (3) a monomer.

11. A magnetic recording medium as in claim 10, wherein a cellulose type resin is nitrocellulose, cellulose acetate butyrate or cellulose acetate propionate.

12. A magnetic recording medium as in claim 10, wherein the monomer is selected from the group consisting of acrylic acid esters, acrylamides, methacrylic acid esters, methacrylamides, allyl compounds, vinyl ethers, vinyl esters, heterocyclic vinyl compounds, N-vinyl compounds, styrenes, acrylic acid, methacrylic acid, crotonic acids, itaconic acids, olefins and the like.

13. A magnetic recording medium as in claim 10, wherein the amount of components (1), (2), and (3) is from 25 to 70 parts by weight, from 10 to 40 parts by weight, and from 10 to 60 parts by weight, respectively.

14. A magnetic recording medium as in claim 9, wherein the weight ratio of urethane acrylate oligomer to acrylate monomer is from 60/40 to 90/10.

15. A magnetic recording medium as in claim 9, wherein the weight ratio of urethane acrylate oligomer to acrylate monomer is from 70/30 to 85/15.

16. A magnetic recording medium as in claim 1, wherein the surface roughness of the coated surface of the support is from 0.015 μm to 0.5 μm.

* * * * *